United States Patent [19]
Cotugno et al.

[11] Patent Number: 6,088,747
[45] Date of Patent: Jul. 11, 2000

[54] SYSTEM FOR REFORMATTING AND BURNING OF DATA FILES HAVING A FIRST FORMAT ONTO A COMPACT DISK TO BE UTILIZED IN A NETWORK USING DIFFERENT FORMAT

[76] Inventors: Lauren Ann Cotugno, 1 Saratoga, Dove Canyon, Calif. 92679; Edward Henry Frankel, 7698 Pepper St., Rancho Cucamongo, Calif. 91730

[21] Appl. No.: 09/026,743

[22] Filed: Feb. 20, 1998

[51] Int. Cl.[7] .................................................. G06F 13/14
[52] U.S. Cl. ........................ 710/74; 707/523; 707/101; 709/217; 711/111
[58] Field of Search ........................ 710/74; 709/217; 707/523, 101; 711/111

[56] References Cited

U.S. PATENT DOCUMENTS

| | | | |
|---|---|---|---|
| 4,283,736 | 8/1981 | Morio et al. | 386/5 |
| 5,229,853 | 7/1993 | Myers | 348/458 |
| 5,394,382 | 2/1995 | Hu et al. | 369/32 |
| 5,566,332 | 10/1996 | Adair et al. | 707/101 |
| 5,592,654 | 1/1997 | Djakovic | 395/500 |
| 5,708,828 | 1/1998 | Coleman | 707/523 |
| 5,892,910 | 4/1999 | Safadi | 709/217 |
| 5,983,295 | 11/1999 | Cotugno | 710/74 |

*Primary Examiner*—Thomas C. Lee
*Assistant Examiner*—Abdelmoniem Elamin
*Attorney, Agent, or Firm*—Alfred W. Kozak; Mark T. Starr; Steven B. Samuels

[57] ABSTRACT

A system and method for transforming specialized data files of a first computer system into industry-standard byte-stream files usable for a second system or other systems. First and second programmatic interfaces of the first system can take the specialized format native data files and transform them into standard formatted byte-stream data files for placement in a storage media of a second computer system which can then be initiated to use a CD Writer package to cause the data files to burned onto a CD-ROM. This CD-ROM can then provide the byte-stream data file for use in many different types of platforms.

5 Claims, 8 Drawing Sheets

FIG. 3

| (i) | (ii) | (iii) | (iv) | (v) | (vi) | (vii) |
|---|---|---|---|---|---|---|
| <CONTAINER ID> | <DIRECTORY LOCATION> | CONTAINER OPTIONS & CONTAINER CHECKSUM | THE WRAPPED FILES | <DIRECTORY ID> | <DIRECTORY OF FILE NAMES AND THEIR LOCATIONS IN CONTAINER> | OPTIONAL <DIGITAL SIGNATURE> |

FIG. 4

| (i) | (ii) | (iii) | (iv) | (v) |
|---|---|---|---|---|
| 'UNISYS000010' | <OPTIONS> | THE A SERIES DISK FILE HEADER + HEADER CHECKSUM | <THE FILE> | <CHECKSUM> AND OPTIONALLY, <DIGITAL SIGNATURE> |

6,088,747

SYSTEM FOR REFORMATTING AND BURNING OF DATA FILES HAVING A FIRST FORMAT ONTO A COMPACT DISK TO BE UTILIZED IN A NETWORK USING DIFFERENT FORMAT

CROSS REFERENCES TO RELATED APPLICATIONS

This application is related to a application, U.S. Ser. No. 08/962,468 which issued as U.S. Pat. No. 5,983,295, and entitled "Method and System for Wrapping Single Files for Burning Into Compact Disk," and filed Oct. 31, 1997 which is incorporated herein by reference.

FIELD OF THE INVENTION

This system relates to methods for enabling data files which are organized in a first format to be reformatted and subsequently burned onto a Compact Disk to enable the data to be transported and utilized in networks utilizing different data formats.

BACKGROUND OF THE INVENTION

In the usage of modern computer systems and networks, the situation arises where systems having one proprietary protocol and data format are connected to systems having different data formats and protocols. Thus in order to provide for systems integration in different networks, it is necessary that there be provided a system or method whereby the data formats of a first system can be transferred to and utilized by the network of a differently oriented system.

For example, the Unisys A Series computer systems involve a Central Processing Unit and memory together with storage such as disk storage which operates under the control of a Master Control Program. These A Series systems use a particular format for the data files compatible with the A Series software which can be placed on CD-ROMs. Thus, the CD-ROMs which contain this A Series software contain an image of a formatted tape which can be utilized only by the A Series systems.

However, when it is desirable to integrate a first system such as the A Series systems for operation with other platforms such as an NT system, then problems arise in that the second system such as the NT system, utilizes formats which are not compatible with the software formats of the A Series system, which is the first system.

Presently, the software for a first system, such as an A Series system with software, is utilized by providing methods to burn CD disks from a Library Maintenance formatted tape. This method has the limitation in that it limits the type of files that are burned into CD-ROMs to those of the native A Series files.

Now, in order to provide for system integration where an A Series system is to be coupled to a NT system, which overall system would be designated as a Unisys ClearPath system, the desirability here would be to make and use a single CD-ROM disk which would carry both the A series software and at the same time carry the NT software.

Thus in this regard, a method is needed to couple the A Series container with their native attributes and also arrange them in a format capable of being stored on a particular media such as a CD-ROM which will also hold the readable software for the NT system.

The A Series systems have containers with specialized attributes which are designated for example, as FILEKIND, CREATIONDATE, and RELEASEID, which are defined in the subsequent Glossary.

As a result, the Unisys A Series systems will provide a programmatic interface to its Master Control Program (MCP) which will provide a mechanism for "wrapping" and for "unwrapping" containers.

Wrapping is a term which is used to define the process of packaging multiple A Series files, along with their Disk File Header information and a checksum and optionally a digital signature, as byte-stream data files, so that they can be transported across as a single entity heterogeneous networks and non-A Series specific media, while still maintaining their native A Series attributes of each individual file.

Unwrapping is a term used to define the process of taking a previously "wrapped file" and coupling each file within the container with the information from its original Disk File Header (DFH) in order to restore the original native A Series files, as they existed prior to being wrapped.

Thus, the problem of a software and file format which is oriented to one system can now be transformed in order to provide a format that is compatible not just for a first system, but also for a first and second system, whereby the second system would not ordinarily be compatible with the first system.

The presently described system and method provides for taking files in a first program format such as used in Unisys A Series systems and developing a second generalized format container for burning into a CD-ROM such that now this second program format container is compatible for both NT and other systems in addition to A Series systems.

A "container," as used herein, involves a byte stream file, usually holding multiple files, together with a directory of the files that are stored.

There is a considered distinction between a "wrapped file" and a "wrapped container." The wrapped container is a special file whose contents include one or more wrapped files and a directory.

A single wrapped file has no directory within itself.

SUMMARY OF INVENTION

An algorithmic sequence is implemented in software for providing and developing specialized multiple native files and a directory into a container in an industry standard format on Compact Disks (CD-ROMs) which disk files can be viewed from either a NT platform, an IBM platform, UNIX platform or other platforms including a Unisys A Series platform using an industry-standard format.

Thus, a company or a person could provide themselves with a Compact Disk Writer Module allowing the person to first receive data by File Transfer Protocol or other data transmission over the Internet, to receive the file data information and then burn it into a Compact Disk. The Compact Disk can be used then to insert the file into the local platform.

The present system is applicable in the Unisys ClearPath environment which involves a situation where two systems are connected to and communicating with each other, for example, such as that both a Microsoft NT platform and a Unisys A Series platform can both read from the same Compact Disk in a compatible fashion. Thus, this makes it possible to put the NT platform software and the A Series platform software all on the same Compact Disk (CD-ROM).

With the use of such a uniform standard Compact Disk, an operator can load and use the NT platform in order to pull the files he needs from the container by using an "Install" procedure which accesses the information on the Compact Disk. Likewise, a person using the Unisys A Series platform can also pull the whole container or individual files from the container, from the CD-ROM by using an "Unwrap" command in order to load the A Series software from the Compact Disk.

GLOSSARY ITEMS

Figure 1A:
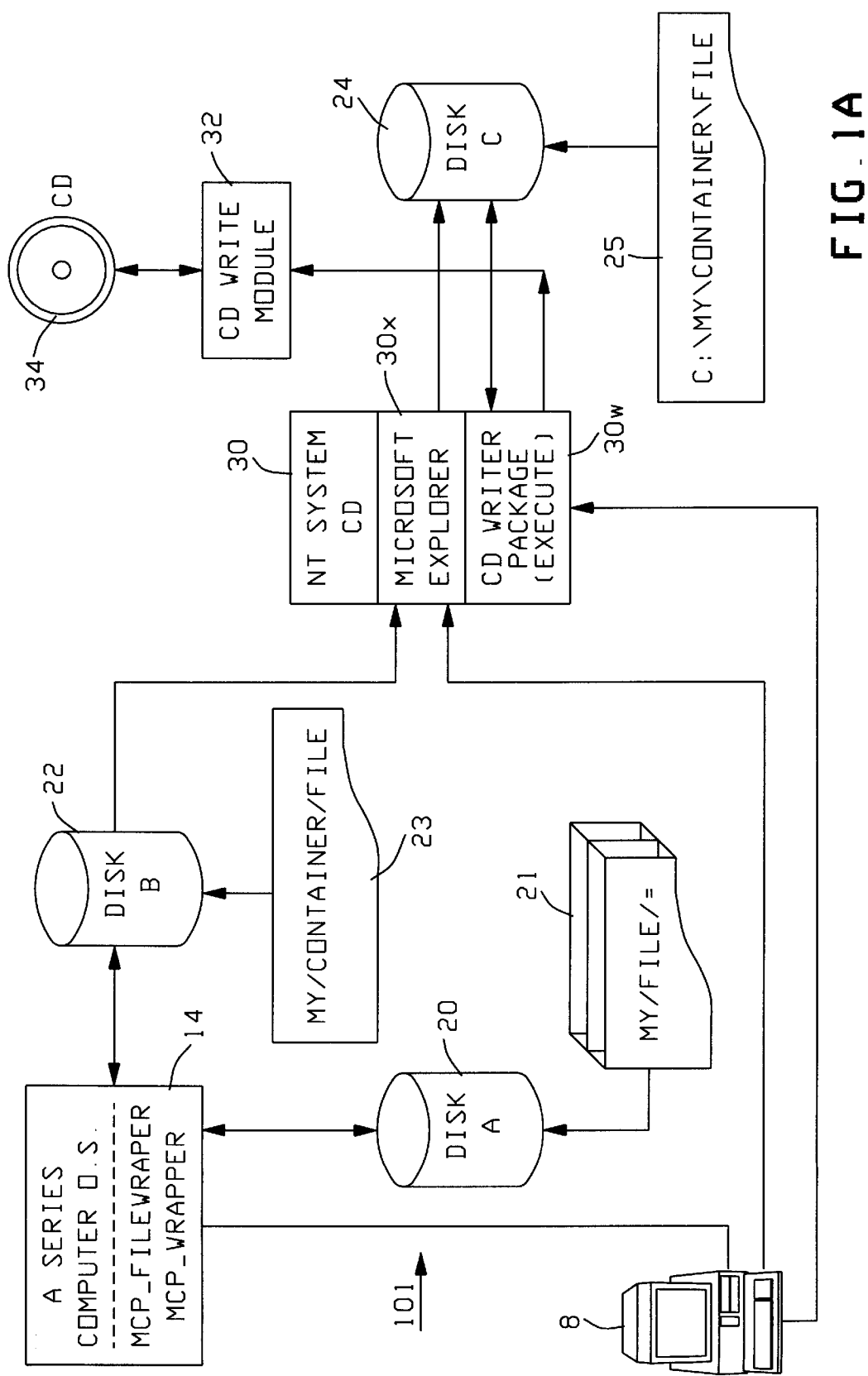
FIG. 1A is a general overview of the present system for burning a container onto a Compact Disk (CD)

1. A SERIES ATTRIBUTES: Native attributes that can be assigned to a file to allow the system to control how the file is accessed and used, and by whom (security privileges). There are somewhere on the order of 450 such attributes for an Unisys A Series file.
2. A SERIES KEYS FILE: A native file, located on a individual system, that contains license key information used to control which features an individual system is allowed to use for some features. License keys need to be purchased by the user before the feature can be utilized on the individual system.
3. ATTRIBUTE INFORMATION OF A SERIES FILES: Specific attributes assigned to individual files stored in the file's Disk File Header (DFH) on Disk which is located in the individual disk's file system directory.
   3a. DISK FILE HEADER: An array containing all of the information necessary to open and access a file on disk, including the Disk Row Address information for all of the areas of a file that is located on the disk.
4. BYTE-STREAM FILE: A character oriented file with FILESTRUCTURE=STREAM, MAXRECSIZE=1, AND FRAMESIZE=8. This is a simple, non-executable, data file than can exist on any kind of system.
5. DATA CD-ROM: See ISO 9660 Format (Item 12 below). These CD's appear like disks on A Series systems. Multiple user access is allowed to these CDs.
6. DIGITAL SIGNATURE: A digital signature is a hash pattern created by applying an industry standard signaturing algorithm (similar to a checksum) to a file or data stream, along with a private key. This hash pattern travels with the file across a network and is used, along with a public key, in order to ensure the file has not been compromised (intentionally or otherwise) during the transfer process.
7. CONTAINER: A single byte-stream file consisting of one or more wrapped files, a simple directory of files stored in the container, and optionally a digital signature.
8. CREATIONDATE: An A Series (Unisys) file attribute, used to store the data and time a file was created.
9. FILEDATA—LFILE: An A Series (Unisys) program, or utility, used to interrogate attribute information of native A Series files.
10. FILEKIND: An A Series (Unisys) file attribute, used to identify the internal structure of the file being accessed (e.g. Algol symbol, Algol object code, character data, or system directory). FILEKIND also sets to identify those files that are "containers" for example, using a FILEKIND mnemonic: CONTAINERDATA (value 186).
11. INTERIM CORRECTION PROCESS (ICP): The process used by Unisys computer systems to deliver software updates to released products held by customers.
12. ISO 9660 FORMAT (A.K.A. ISO STANDARD FORMAT, HIGH SIERRA FORMAT): A standard format used for directories and files on CD-ROM disks. The presentation for the information contained on these directories is at the operating system's discretion. On Unisys A Series systems, directories and files are viewed using the standard CANDE "FILES" and ODT "PD" commands. CANDE refers to a Command and Edit Language.
   12a. CANDE: Command and Edit Language which involves Unisys A Series primary interactive environment software.
   12b. ODT: Operator Display Terminal (also called System Console). It is a main operations station or console used for controlling Unisys A Series system activity.
   12c. PD: Print Directory. The Unisys A Series system command used to list all of the files located on a disk, as stored in the disk's directory.
13. LIBRARY MAINTENANCE FORMAT: A Unisys proprietary format for tapes containing multiple files used primarily for archives, backup of restore, and transferring of files among A Series systems.
14. LIBMAINT CD-ROM: A specially formatted CD-ROM, created on an ISO 9660 Formatted CD-ROM, that contains an image of a Library Maintenance tape. This appears to an A Series system as if it were a Library Maintenance tape. Only one user is permitted access at a time, and only COPY (and COPY-related) syntax, and Filedata TDIR are allowed to act on this CD.
   14a. TDIR: Tape Directory Command issued to the File Data program to obtain directory listing of files stored on a Library Maintenance Tape or Compact Disk.
15. NATIVE A SERIES FILES: A file created on Unisys A Series systems or ClearPath HMP/NX systems specifically for use on that same class of systems.
16. NON A SERIES FILES: Files that were created on systems other than Unisys A Series or ClearPath HMP/NX systems.
17. NEW FORMAT FILE: The Byte-Stream data file that results from executing the WRAP process on an A Series file.
18. NT SOFTWARE—CD BURN PROCESS: Any standard "Offthe-shelf" package capable of burning images onto a Compact Disk (CD) that runs on a Microsoft NT system.
19. P, Q, G, keys: Primary numbers, stored in the system's digital signature keys file and used in the creation of public/private keys as well as both signing files and verifying the signatures of files, using the public and private keys.
20. PUBLIC & PRIVATE KEYS: Public and private key pairs are generated at the same time by a special utility. These key pairs are used to create a signature and then later check that signature to ensure that a file has not been compromised. These keys are generated together and must be used together to ensure the integrity of a file. Under normal operations, the private key is intended to be known only by the person or utility generating the hashed signature of the file. This key is meant to be restricted. The public key can be made available to any person or utility wishing to check the signature to ensure the integrity of the file once it has reached its destination.

21. PUBLIC/PRIVATE ENCRYPTION: A common methodology for encrypting files so they may be transported across an open network so as to use a public/private password encryption scheme. Typically, the two passwords are programmatically generated at the same time such that they can be used in conjunction with each other. One password, the private one, will be used to encrypt the file. The other password, the public one, is used by the recipient of the file to decode it. Typically, a smear pattern, or some clear text string, is added at the beginning of the file before the file is encrypted. When the file has been decoded using the public password, this smear pattern should match what was originally placed in the file. If the string does not match, it can be assumed that the integrity of the file has been compromised.

22. RELEASE ID: A Unisys A Series file attribute, used to store the specific release level that the software was created for.

23. SHARE: A Directory or disk that is made available to selected or all users across a network.

24. UNWRAP: The process of taking a previously wrapped file (or data stream) and coupling it with the information from its original Disk File Header, to re-create the original native A Series file as it existed prior to being wrapped.

25. WFL SYNTAX: Work flow language syntax, used to control job flow on a system.

26. WFL UNWRAP syntax: Specific work flow language syntax used to execute the unwrap process on a file, or files.

27. WRAP: The process of packaging an A Series file, along with its Disk File Header information and a digital signature, as a data stream, or as a byte-stream data file (FILESTRUCTURE=STREAM, MAXRECSIZE=1, FRAMESIZE=8), so that it can be transported across heterogeneous networks and non-A Series specific media, while still maintaining its native A Series attributes.

28. INPUT FILE: The already existing file that is to be packaged into a byte-stream text file by the wrap process.

29. OUTPUT FILE: The resultant byte-stream text file created by "wrapping" the input file.

GENERAL OVERVIEW

As seen in FIG. 1A, a user terminal 8 is connected to a first operating system 14, such as a Unisys A Series computer, having outputs to a disk A,20 and a disk B,22.

A second operating system, such as NT platform system 30, utilizing the Microsoft Explorer program 30x and a CD Writer Package 30w, communicates with disk C,24 so that the User terminal 8 can initiate the CD Writer Package 30w to energize the CD Write Module 32 in order to burn a container onto the compact disk (CD) 34.

Figures 1, 2A:
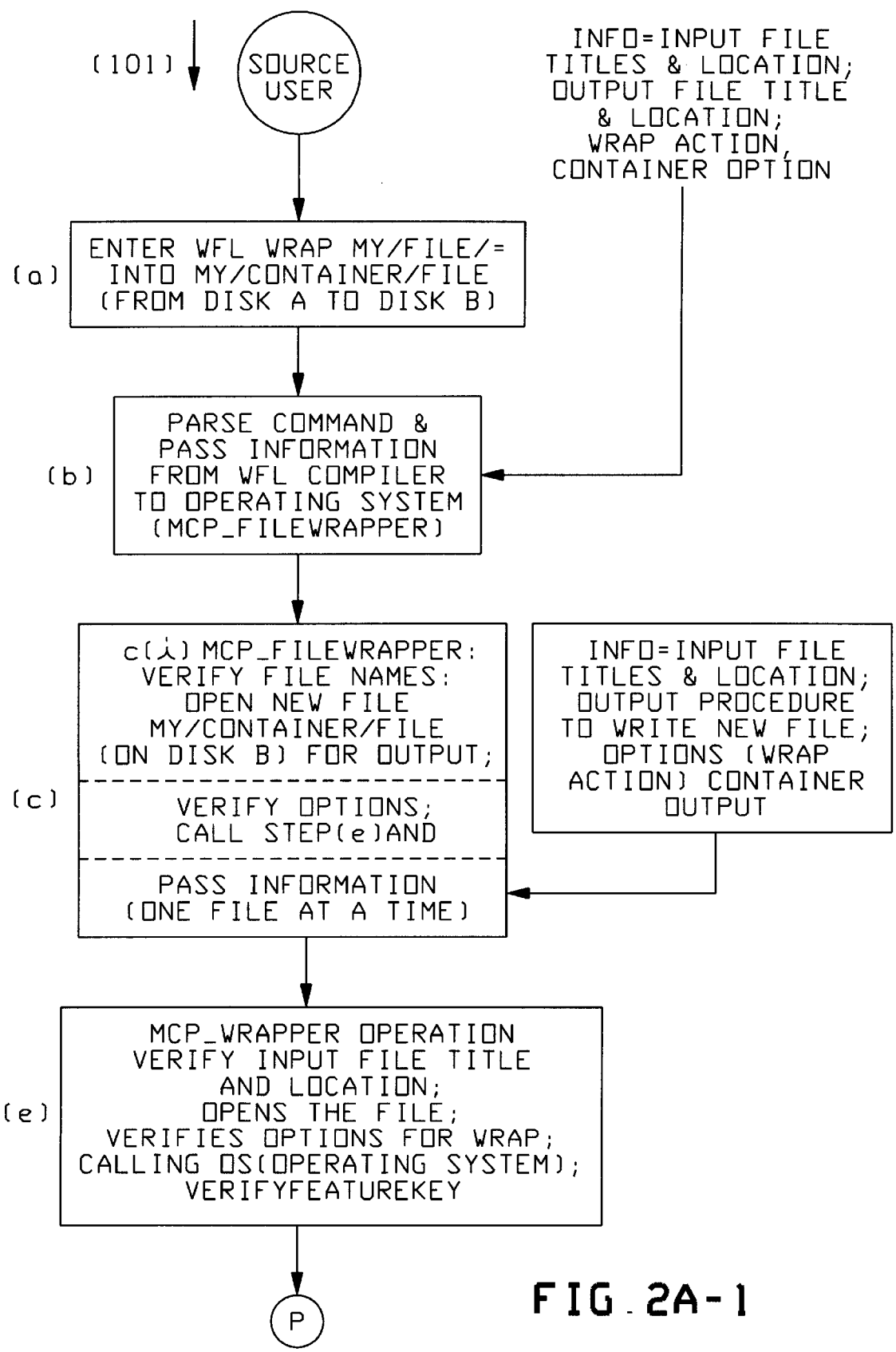
FIGS. 2A (-1,-2,-3,-4) and 2B are flow charts indicating the system of steps involved for burning a CD-ROM with the container in a generalized protocol format suitable for Internet transmission and for compatibility with NT or other platforms.

The disk A,20 holds data designated as MY/FILE/= where the "=" notation signifies multiple files for item 21, FIG. 1. The disk B,22 holds the data designated MY/CONTAINER/FILE,23. The disk C,24 holds the resultant data designated C:MY\CONTAINER\FILE, 25. The data 25 of disk C,24, is controlled by the CD Writer 30w for transmittal to the CD Write Module 32 for burning into the compact disk (CD) disk 34. It may also be noted that Disk A and Disk B could actually be the same physical device. It is not necessary that they always be two separate entities.

In summary, the User terminal 8 will use the channel marker cycle designated 101 to the first system computer 14 with a WFL WRAP command [input files] to process input files from the input disk media such as disk A, 20 over to an output container an output disk media such as disk B,22.

Then using channel marker cycle designated 102, the User terminal 8 will communicate with the NT system 30 having Microsoft Explorer 30x, in order to start an operation which drags the container from the A Series' disks B,22, and drops the file onto the NT systems' disk C,24.

The User terminal 8 using the designated channel marker cycle 103 then executes the CD Writer Package 30w by initiating the CD Write Module 32 in order to burn the container 25, C:MY\CONTAINER\FILE, onto the CD (compact disk) unit 34.

Finally at this time, the resultant file data on the compact disk 34 is in a protocol compatible for usage by other platforms.

Figure 1B:
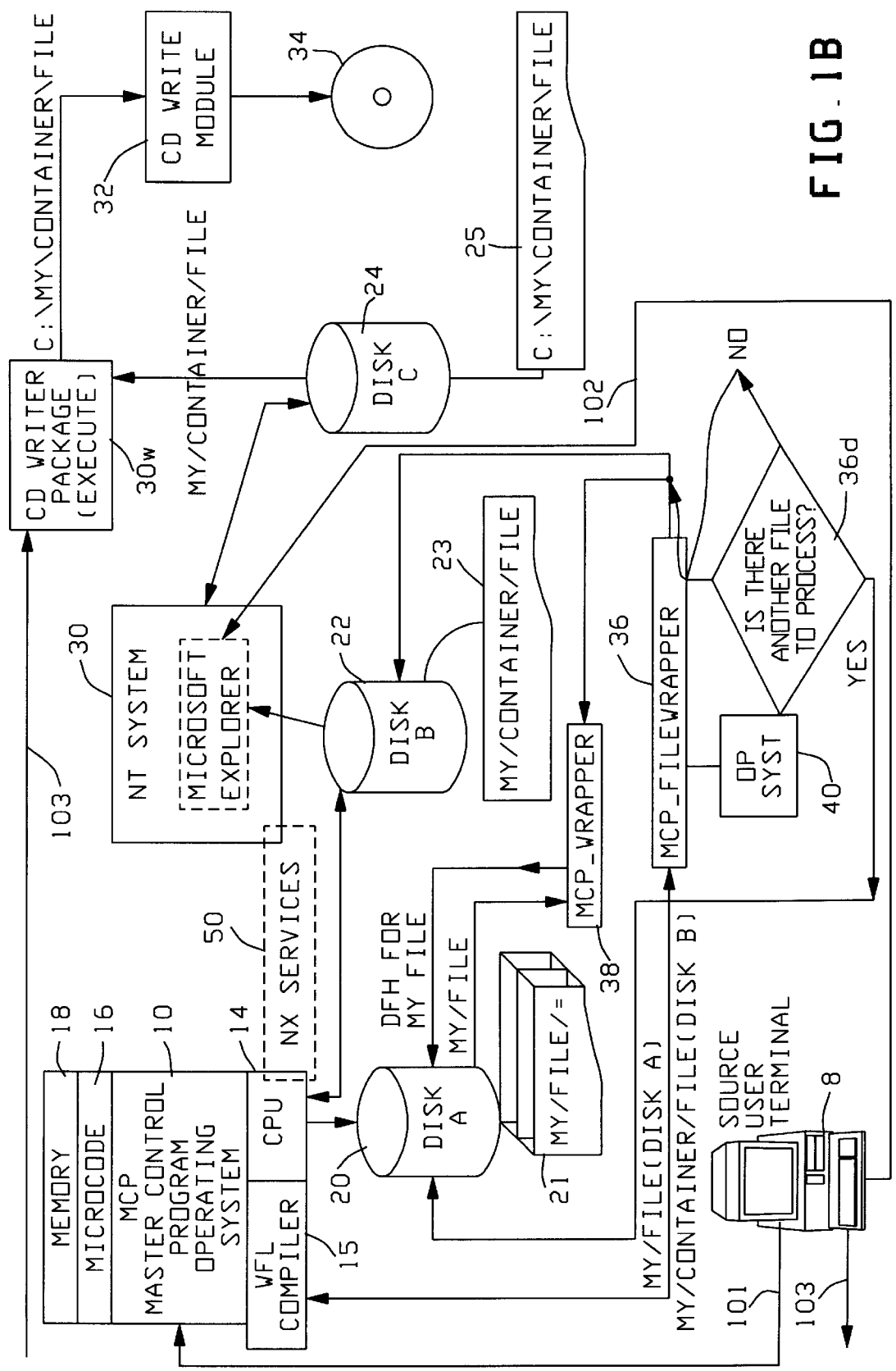
FIG. 1B is a more detailed block diagram of the system which enables the production and burning-in of a Compact Disk with a container which is compatible to both a first protocol system and a second protocol system.

In FIG. 1A, the second system designated as the NT system 30 could also be designated alternatively as a UNIX system, in which case, the NX services 50 shown in FIG. 1B would not be required and the Microsoft Explorer program 30x of FIG. 1A would be replaced by the industry-wide standard File Transfer Protocol (FTP).

FIG. 1B will be subsequently described herein to indicate the hardware system in greater detail.

DESCRIPTION OF PREFERRED EMBODIMENT

Referring to FIG. 1B, there is seen a drawing of the major elements involved in the present system.

A first system is shown, for example, such as a Unisys A Series computer operating system which involves a Central Processing Unit 14, a main memory 18, a microcode memory 16 which is managed by the MCP 10 (Master Control Program). The CPU 14 is also supported by a storage media 20, Disk A, which will be enabled to carry the original files 21, designated MY/FILE/= which is formatted suitably for the first system such as the A Series computer system, and Disk B,22, which will be enabled to carry a container new file 23 designated MY/CONTAINER/FILE, which is formatted for transport to a second system.

Now, in the sense of integrating to other systems, there is seen a second system called the "NT System 30" (alternatively a UNIX, IBM or other system) which is a platform developed by the Microsoft Corporation of Redlands, Wash. The NT System 30 is seen having a storage medium 24 such as Disk C, which will eventually be provided with a resultant file 25 designated C:\MY\CONTAINER\FILE.

The Central Processing Unit 14 is provided with a WFL (Work Flow Language) compiler 15 which is an interpretive language capable of taking User instructions and translating them into Operating System (O.S.) procedure calls. The CPU has an organized relationship to the NT system 30 through use of a NX services unit 50.

NX/Services is a software unit used to integrate MCP operations with NT platform operations through the use of a Microsoft (MS) Standard RPC (Remote Procedure Call) interface.

The WFL compiler 15 is an interpretive compiler which provides a new language syntax using the word "Wrap".

The Operator Terminal 8 of FIG. 1B, is the operator interface in which an operator would enter a command such as "WRAP MY/FILE/=", which are the files 21 sitting in Disk A and MY/CONTAINER/FILE which is the file 23 (FIG. 1B) residing in Disk B. This command is transmitted through the MCP (or Master Control Program 10) in order to initiate the action of the WFL compiler program 15.

The compiler 15 then calls the MCP_FILEWRAPPER program 36 whereby the compiler passes the parameters as input to this software program. The MCP_FILEWRAPPER program 36 will then take the original multiple files MY/FILE/=,21 from Disk A, 20 and convert them to a new container designated MY/CONTAINER/FILE 23 and deposit this onto the storage disk B,22.

The MCP_FILEWRAPPER software 36 will communicate with the MCP_WRAPPER 38 program indicating that the data should be processed or wrapped.

Thus, the MCP_WRAPPER program 38 communicates back to disk A,20, for each file in MY/FILE/= and gets the Disk File Header information (DFH) which contains the native A Series attribute information for the files in the container, and the MCP_WRAPPER program actually operates to Read the multiple files and directory on Disk A and transmits this data to the MCP_WRAPPER 38 Program.

The MCP_WRAPPER Program 38 then packages the information of the Disk File Header with the data and passes it back to the output procedure of MCP_FILEWRAPPER 36 with a command to." ... Write this out to storage Disk B, 22, as the new container file, (23, MY/CONTAINER/FILE).

The MCP_FILEWRAPPER program 36 of FIG. 1B is seen to have a decision tree 36d whereby the programs check to see if there is another file to process. If "yes," then another file of MY/FILE/=,21 on Disk A (20) is processed until the decision tree 36d indicates a "no," at which time the MCP_FILEWRAPPER program 36 will write the Output Directory from Memory 18 to the Output File on disk B (22) as part of the MY/CONTAINER/FILE 23.

As a result, there is now a data file 23 provided onto the storage Disk B, 22. This file, MY/CONTAINER/FILE, 23 is now available to the NT system platform 30 from the file 23 residing on Disk B, 22.

Another example of a problem that arises is the situation where there are two separate and different A Series computers, whereby the first computer has data and information (files) which it is desired to give or present for use by the second computer system. Normally, if the first system file is in object code, it is then necessary to put it on a tape and mail it to the second computer User or alternatively, to have the first system and second system connected to each other through a proprietary network connection. However, this is sometimes a long and cumbersome process, when it would be most desirable to be able to transmit it electronically to the second user through an open network such as e-mail or FTP (File Transfer Protocol).

Thus in the present example, the first computer system user would take his object code file and do his wrapping operation using the WFL WRAP command or (Work Flow Language wrapping).

Thus, a "new container file" such as MY/CONTAINER/FILE 23 can be generated and this new container can then be downloaded into a personal computer, such as in the second system, NT 30 and sent via Internet mail to the second user, or this data file can be burned into a CD-ROM and delivered to the second user.

It should be noted that once the new container 23 has been placed on storage Disk B, 22, then by the use of the NX services 50, this container 23 can be transmitted to the NT system 30. Thus, the NT system with its hard Disk C,24, can now receive and utilize the container (as C:\MY\CONTAINER\FILE) which came from the storage Disk B,22.

Another problem aspect involved is when an operator wishes to take a file from a first system, such as an A Series system program and copy it into a UNIX box or an NT box—that information cannot normally be transported because of the format and protocol differences.

Thus, the specialized structure and format of the A Series native files which normally could not be moved across a network, would have to be reconstituted and stored as part of the data in the data file and then made into a regular character data file of a common format such that any operating system can read it. This would be a byte-stream data file which could be read by any platform, whether it be a UNIX box, an IBM box, or a NT box. Thus, resultantly there is now a file that any platform can read.

In what is called the "Unwrapping" operation, all the time-stamped dates are reapplied, all the disk, row, address information is supplied, the file is rewritten row for row, segment for segment, exactly as it looked on the original system. Thus, if there were "spaces" at the end of the segment on the original file, there will also be the same spaces at the end of this segment on the resultant file. This is so because all this information is in the file's Disk File Header.

Thus, what has been accomplished is to take a first original native container file and repackage it, by burning the container into a CD-ROM, so it can be transported anywhere to a second location, and then be loaded to act like the original container.

One method of getting system software out from the originator to a customer is on a Compact Disk, that is a CD-ROM, which has specially formatted arrangements in order to transmit A Series software. However, these files often are not always in an industry standard format.

Customers often ask saying that they have a Compact Disk writer on their PC and they want to know—"how do I format my native A Series files so that I can distribute this software to my other terminals" or to other customers that they have in their area?

Thus, the present system allows these recipients to download these containers to their personal computer and then burn them into a Compact Disk and send them to their local co-workers or to their other customers. The burned-in files on the Compact Disk are burned using Industry Standard format for compatibility to other systems platforms, such as NT system platforms, UNIX system platforms, IBM system platforms, DEC System platforms and Unisys A Series system platforms.

Thus, the present system operates such that operators using the A Series systems can unwrap their files directly from an industry compatible Compact Disk, so that the file is usable just by putting the Compact Disk into the A Series system and giving it the command to "Unwrap Files". The files and software can then be received for utilization.

The present system requires the packaging of native container of a first computer system such as a Unisys A Series system, in such a way as to allow them to co-exist on the same CD-ROM media, as non-native (A Series computer system) files. This packaging of containers also allows for the transport of the native (A Series) containers across heterogeneous networks, while still maintaining information on their native (A Series) attributes.

Previously CD-ROM's contained native A Series software on CDs (computer disks) which were burned from a library maintenance formatted tape. However, this limited these types of files to only be useful for native A Series systems which are formatted for native A Series files. The present system provides an expanded ability for burning the native A Series files of software for a first computer system onto CD-ROM disks which will be compatible with suitable files for a second computer system, such as a Microsoft NT system and other platforms.

The native formatting of A Series files had attributes such as FILEKIND, CREATIONDATE, and RELEASEID, which now need to be placed in a format capable of being stored on a disk media which is using an industry-standard file format.

As mentioned earlier, "Wrapping" is a term used to define the process of packaging a native A Series file (first computer system) along with its Disk File Header information, (plus either a checksum, or optionally a digital signature), as a byte-stream data file (FILESTRUCTURE=STREAM, MAXRECSIZE=1, FRAMESIZE=8) so that it can be transported across heterogeneous networks and non-A Series specific media, while still maintaining its native A Series attributes.

The "digital signature" is created using an industry-standard public key/private key signaturing algorithm which provides a measure of security in that it allows a user confidence as to where the file originated from. The present system encompasses the Master Control Program (MCP), the Work Flow Language (WFL) program, and the FILE-DATA work necessary to wrap files by packaging them into new, byte-stream files (wrapping) and later restoring them to their original native A Series format when needed for A Series systems (Unwrapping).

NEW WFL SYNTAX: This involves a new work flow language syntax, so that arrangements are made in the WFL compiler 15 to support the new syntax which will have some similarity to a previous Library Maintenance MOVE command. The new syntax allows a User to wrap either a single file, a list of files, or a directory of files, in addition to subsequently enabling the unwrapping of these files, by specifying both the input file and the output file, or the directory title and location.

ADDED FIRST PROGRAMMATIC INTERFACES (MCP FILEWRAPPER): A first programmatic interface is provided that will allow the User-Caller to pass native A Series files' titles and location as "input" along with an "output" file, title and location. The "output" file will be a "byte-stream" file with a beginning data block containing (i) an identification stream; (ii) directory location within the file; (iii) container option information and container checksum; (iv) one or more wrapped files; (v) directory indentification stream; (vi) directory of wrapped files within the container; and (vii) and ending block containing an optional digital signature.

Thus, the first added programmatic interface allows the caller to pass byte-stream file's title and location as input, along with an output file title and location if needed, for use of the "unwrapping" process. The "resultant file" will be a native A Series file created with the output file and location, but also containing the data and all of the native A Series attributes of the original file.

SINGLE PROCEDURE CALL: This first programmatic interface will allow input and output directory names to be passed in order to wrap or unwrap a directory of files with a single procedural call. This also allows for a single output "container file" to be created from multiple input files.

SECOND PROGRAMMATIC INTERFACE (MCP_WRAPPER): This interface is created to allow a caller to pass the A Series file's title and location as "input", together with an "output" procedure. The data returned to the caller's output procedure will be a stream of data with (i) a beginning data block containing an identification string; (ii) the original file's Disk File Header information; (iii) the file itself as byte-stream data; and (iv) an ending block containing a checksum or a digital signature.

Functionally, the second programmatic interface will also allow the caller to pass an input procedure, along with the title and location of an output file. The data passed to the input procedure here would consist of a stream of data, with a beginning data block containing the identification string, the original file's Disk File Header (DFH) information, the file itself as "byte-stream data", and also an ending block containing the checksum or the digital signature, which is basically the same information that was passed to the output procedure when the file was originally wrapped. Here, the "resultant file" will be a native A Series file created with the output file title and location, but containing the data and all of the native A Series attributes of the original file.

NEW FILEDATA SYNTAX: New syntax has been added to the FILEDATA LFILEs command in order to specify that the file being interrogated is a WRAPPEDDATA file or a Container Data File. If this is a WRAPPEDDATA file, then FILEDATA will report the "attributes" of the native A Series file contained within the wrapped data file, rather than the attributes of the "wrapped" data file itself. If this is a CONTAINERDATA file, the FILEDATA will report the attributes of all of the Native A Series files contained within the CONTAINERDATA file rather than on the "container" file itself.

WFL WRAP COMMAND: This is the work flow language wrap command usable in a first system computer such as the Unisys A Series computer system which can be executed to initiate the action of taking specialized formatted native A Series container files and turning them into byte-stream files which can later be burned onto CD-ROM disks. Thus, the software files of a first computer platform, such as the Unisys A Series system, can now be made able to co-exist on the same data CD-ROM's as other types of software which are not A Series software.

KEYSFILES: The system will provide the use of A Series KEYSFILE which will also be wrapped using the new WFL syntax. This resulting file will also be burned onto the CD-ROM. Normally, the Unisys A Series KEYSFILES are shipped on separate tapes from the rest of the software releases, so that in the present situation, the newly wrapped KEYSFILE will be shipped on a separate data CD-ROM separate from the rest of the A Series release software files.

The A Series KEYSFILE is a file on each A Series system used to store License Key information for the individual system in order to determine which of the Unisys licensed features the user has purchased for use on that system.

The new WFL UNWRAP syntax can be used to unwrap the KEYSFILE off of the CD, while copying it into the A Series system. Once the file (as KEYSFILE) has been copied onto the A Series system, then a IK MERGE can be performed. IK MERGE is the system command used to merge the data from the new KEYSFILE (unwrapped from the CD ROM onto Disk) on the A Series system into the system's current KEYSFILE.

CHECKSUM: A checksum is calculated for the Disk File Header (DFH) for every file as it is wrapped. This ensures that there is no unintentional corruption of the Disk File Header as the file is shipped across a network. It also provides the receiver of the file some measure of confidence as to the origin of the file.

In addition to the checksum for the Disk File Header, a checksum is also calculated for the entire context of the file including the Disk File Header (DFH).

SIGNATURE AND CHECKSUM (PREVENTION OF CORRUPTION): The checksum will not normally be sufficient to ensure that a Disk File Header has not been intentionally corrupted, since the checksum algorithm is not protected and is fairly easy to reproduce. There is significant overhead to validate the Disk File Header if there were no protection of the structure, other than the simple checksum. Thus, without any real protection for the Disk File Header, it would be necessary to create an entirely new Disk File Header for the original file, and then separately validate every attribute of the header before it could be considered trustworthy for application.

The Master Control Program (MCP) 10, FIG. 1B, will assume that a Disk File Header is a valid piece of data. However, it is necessary to validate the Disk File Header before the rest of the file has even been retrieved, since even the information regarding the "size" of the file is stored in the Disk File Header. In order to insure that there was no intentional corruption while a container file was in transit and also provide the "receiver" of the container file with some insurance that the sender of the container file was indeed that who the receiver expected it to be, a digital signature may be requested when files are wrapped into a container by specifying a private key with which to identify the signature file while wrapping. The receiver "must" specify the file's public key in order to verify the container when unwrapping it.

PUBLIC/PRIVATE KEYS FOR SIGNATURING: A KEYS generation utility is provided as a separate utility to generate public/private key pairs to be used when signing files. Public/Private key pairs are generated using the new utility in order to be used by the wrapping interfaces for signaturing files.

A CONTAINERDATA FILE: This will be a simple byte stream file of the Format shown in FIG. 3 with sections designate (i) to (vii).

Section (i) is the <Container ID> which is EBCDIC data used to indicate that this is a Container File.

For example, this identifier can be designated MCP_FILEWRAPPER 442. This identifier could be subject to change if the format or contents of the file changes.

Section (ii) <Directory Location> is a 6 character index to the location of the directory of this container.

Section (iii) labeled "Container Options and Container Checksum" contains the options used when wrapping the container such as an identifier to be used to locate the "public key" information in order to verify a container with a digital signature.

Section (iv) <The Wrapped Files> are the wrapped files themselves. This is the data returned by the I/O_WRAP call back procedure in the MCP_WRAPPER program for each file placed into the container.

Section (v) <Directory ID> is EBCDIC data used to identify the directory in a container file. For example, this identifier could be "DIRECTORY 442" and could be changed if the format or contents of the directory changes.

Section (vi) <Actual Directory> is the directory for all of the files in the container. The directory contains the standard form name of each file in the container, followed by a six (6) character index to the location of the beginning of the wrapped file itself.

Section (vii) is the optional area for a digital signature.

WRAPPEDDATA FILE FORMAT: With reference to FIG. 4, there will be seen the format of the WRAPPEDDATA FILE which will be a simple byte-stream file. This file, as seen in FIG. 4, will contain several sections. The first section (i) is the word UNISYS "000010" which will be "EBCDIC" data used to indicate that this is likely to be a Wrapped File. The number associated with this identifier may be changed if the format of this file is changed.

The second block (ii) labeled "options" contains the options used when wrapping the file, such as the identifier to be used to locate the "public key" information in order to verify a file containing a digital signature.

The third block of FIG. 4 is (iii) designated as the Disk File Header, which involves a copy of the actual A Series Disk File Header for the file. This will become the actual Disk File Header for the file when it is restored to its native format after an "Unwrap" operation. Additionally in block (iii), there is seen the Header checksum, which is a separate checksum for the Disk File Header itself.

The fourth block (iv) of FIG. 4 indicates "the file" which involves the contents of the file itself, written as byte-stream data.

The fifth block (v) of FIG. 4, is designated as "checksum" or "digital signature", which will be either the checksum or the signature calculated for the file and the Disk File Header combined, using a private key from a public/private key pair. An "options" signal will indicate whether this is a signature, or it is a checksum.

DSAKEYSFILE FILE FORMAT: The new system involves a keys file called "SYSTEM/DSAKEYSFILE". This file is stored and managed similarly to the manner of existence on earlier A Series systems which used the "SYSTEM/KEYSFILE". This file is used to store records of ID, software level, public key, PQG. These involve the following:

(i) ID: This is a unique and meaningful EBCDIC string with a length of up to 17 characters which is used for external display and for identifying the set.

(ii) Software Level: This is a real number that identifies the software level involved.

(iii) Public Key: This is a DSA key generated along with a private key based on certain prime numbers designated P, Q, G. This key is subsequently used in the "Unwrap" process of the A Series software.

(iv) P,Q,G: These are prime numbers generated by a special utility. For a given set of (P,Q,G), there are a variety of public and private key pairs which can be generated.

INTERFACE OPERATIONS: This system involves new work flow language (WFL commands) designated as WRAP and UNWRAP which are provided to allow Users a simple method of invoking the new interfaces of this system.

There are two new FILEKIND values created to identify the files of the new format. These will help to prevent users from accidentally using the WRAP syntax to act on a file that has already previously been wrapped.

There is basically now provided two new programmatic interfaces designated as (i) MCP_FILEWRAPPER and also (ii) MCP_WRAPPER. These programmatic interfaces are exported out of the Master Control Program (MCP) 10.

FILEKIND: This involves a set of values which will aid in identifying files that have been wrapped as long as the files have never left the environment of the first computer system, that is to say, the A Series computer. Once the file has then been copied into a non-A Series system, and then back onto the A Series system, this information is lost.

The main purpose of new FILEKIND value is to ensure that a user does not accidentally attempt to WRAP an already WRAPPED file, as would be the case if a WFL WRAP command was executed on a directory of files and then the system did a Halt/Load before all of the files of a directory were wrapped. If the job were to restart after the Halt/Load, the WRAP command would begin to act on the directory over from the very beginning. If a file is encountered with a FILEKIND or with a WRAPPED-DATA value, that file will be skipped, and an error message will be issued for the file indicating that the file had already been previously wrapped.

WORK FLOW LANGUAGE (WFL): The work flow language syntax is provided to allow a user easy access to the new programmatic interfaces. The new WFL commands permit the user to access the new interfaces to institute a wrap or an unwrap action without having to know the layout of the interfaces or having to create a program to call up these interfaces.

TASKSTRING: This is a data structure that contains private or public key information for either signaturing or for verifying the signature of the file. Thus, for a "Unwrap" operation, the TASK STRING will be used to specify the public key that should be used to verify the signature that was calculated when the file was wrapped. Then conversely, for the WRAP operation, the TASK STRING is used to specify the "private key" that should be used to calculate the signature of the file.

MCP_FILEWRAPPER INTERFACE: The newly developed MCP_FILEWRAPPER program is used for work flow language support and User programs. A User can call this program specifying either a "Wrap" or an "Unwrap" action along with the title and the location of both the input files and the output files. Of course, the input file specified for a "Wrap" operation must not have a FILEKIND of WRAPPEDDATA unless the Wrap is specified as "into" an output container. Further, the caller must have the proper privilege for both the input and the output files or directories.

The MCP_FILEWRAPPER program involves procedures which return errors. These errors are returned as display messages if the procedure is called from the Work Flow Language (WFL).

MCP_WRAPPER INTERFACE: When this interface program is called to "Wrap" a file, it takes a standard form name for an existing A Series file, along with an output, or Write, procedure. The A Series files Disk File Header (DFH) will be checksummed and passed to the output procedure as data along with the checksum. Then the file itself will be read and passed onto the output procedure as data. Finally, there will be provided (optionally) a calculated digital signature or a checksum for the entire file which will be passed to the output procedure as data.

When the MCP_WRAPPER program copies a file from disk (i.e. "Wraps" the file), it updates the files COPY SOURCE time-stamp in the Disk File Header (DFH) of the A Series file that has been wrapped.

One of the parameters for the MCP_WRAPPER is the procedure designated IOWRAP. IOWRAP is the procedure being passed, either as an output or a WRITE procedure for Wrap or an input or READ procedure for the Unwrap. The parameters for IOWRAP involve (i) LGTH: which indicates the length array data in bytes; (ii) DATA: is the array containing the data to be WRITTEN when for wrapping or READ for unwrapping.

It is significant to note that a Disk File Header (DFH) can involve data up to about 20,000 words long. Thus, the IOWRAP parameter procedure must be able to handle at least 20,000 words in the data array in one call.

DSAKEYSFILE: The wrapping routine upon recognizing that a digital signature is required, obtains the P,Q,G, values from the active DSAKEYSFILE. It then provides these values, along with the User-furnished private key, to the DSA "signing" routine. This routine, after signaturing the file, returns two large integers designated R and S. These two integers can be stored within the file by the wrapping process.

When this file is unwrapped, the unwrapping routine gets the P,Q,G values from the active DSAKEYSFILE. The file's R and S values, along with P,Q and G, and the User-supplied public key, are then passed onto the DSA signature verification routine. If there is no User-supplied public key, the public key from the active DSAKEYSFILE is used.

The DSAKEYSFILE is an unblocked file which consists of records whose maximum record size is 60 words in length. The general information record contains miscellaneous data about the file, for example, version, number of search table records, number of key entries, etc. This record is then followed by one or more search table records which in turn, contain a number of four word search entries. Following the search table records are the data records with each containing a different set of [ID, software, public key, P,Q,G].

The main purpose of the DSAKEYSFILE is to store the P,Q,G primes used when creating public and private key pairs. It is also used to store frequently used public keys which are normally about 60 characters long, so the caller of Unwrap does not need to enter this character string every time an Unwrap process is requested on a digitally signatured file.

This procedure involves a further procedure entitled "GET_DSA_PQGKEY" which obtains the corresponding set of [P,Q,G, public key] from the active DSAKEYSFILE and returns that set to the caller.

ALGORITHMIC SEQUENCE FOR BURNING A COMPATIBLE COMPACT DISK INTO A STANDARD INDUSTRY FORMAT: FIGS. 2A (2A1, 2A2, 2A3, 2A4) and 2B illustrate the various sequential steps involved in programming container files which is taken from a first format system, such as an A Series container files, and converting then to a standard industry format set which is compatible for other platforms, such as the NT platform.

Referring to FIG. 2A-1, the source User will initiate the operation at marker cycle 101 for developing the Compact Disk by entering at step (a) the command WFL WRAP MY/FILE/INTO MY/CONTAINER/FILE from Disk A to Disk B.

At step (b), this command is parsed and passed from the WFL compiler 15 over to the operating system 10 and into the program 36 designated MCP_FILEWRAPPER.

At step (c), the MCP_FILEWRAPPER program 36 AT (cl) will then verify the names of the files, then open up a new file MY/CONTAINER/FILE on Disk B to be outputted: it will verify the options and then call step (e) as seen in FIG. 2A-1, once for each input file.

At step (e) of FIG. 2A-1 there is involved the MCP_WRAPPER operation. At step (e), the software operation involves verifying the input file title, and opening the file; verifying the options for wrapping the file; verifying the file license applicability by calling the operating system and verifying the feature key.

Then subsequently, (as seen in FIGS. 2A-2 through 2A-4) the step (e) involves a series of sub-steps going from (e) (i) over to (e) (xii). These involve the following:

At step (e)(i), (FIG. 2a-2) the MCP-WRAPPER operation will copy the input files and send a Disk File Header to an intermediate local storage array in memory, 18. This array provides temporary data storage so that there is no chance of accidentally acting on the "real" DFH or data for the file.

Then at step (e)(ii), the MCP_WRAPPER operation will add a checksum to the end of the array.

At step (e) (iii), the program will save the checksum in a local variable, and then at step (e) (iv), it will call the output procedure (d) in order to Write the Disk File Header (DFH) to the output data file.

At step (d) an output procedure is executed which provides for an array of data file information and whereby this array is written to an output file (MY/CONTAINER/FILE). Additionally, any I/O errors are returned to the User or caller.

Figures 2, 2A:
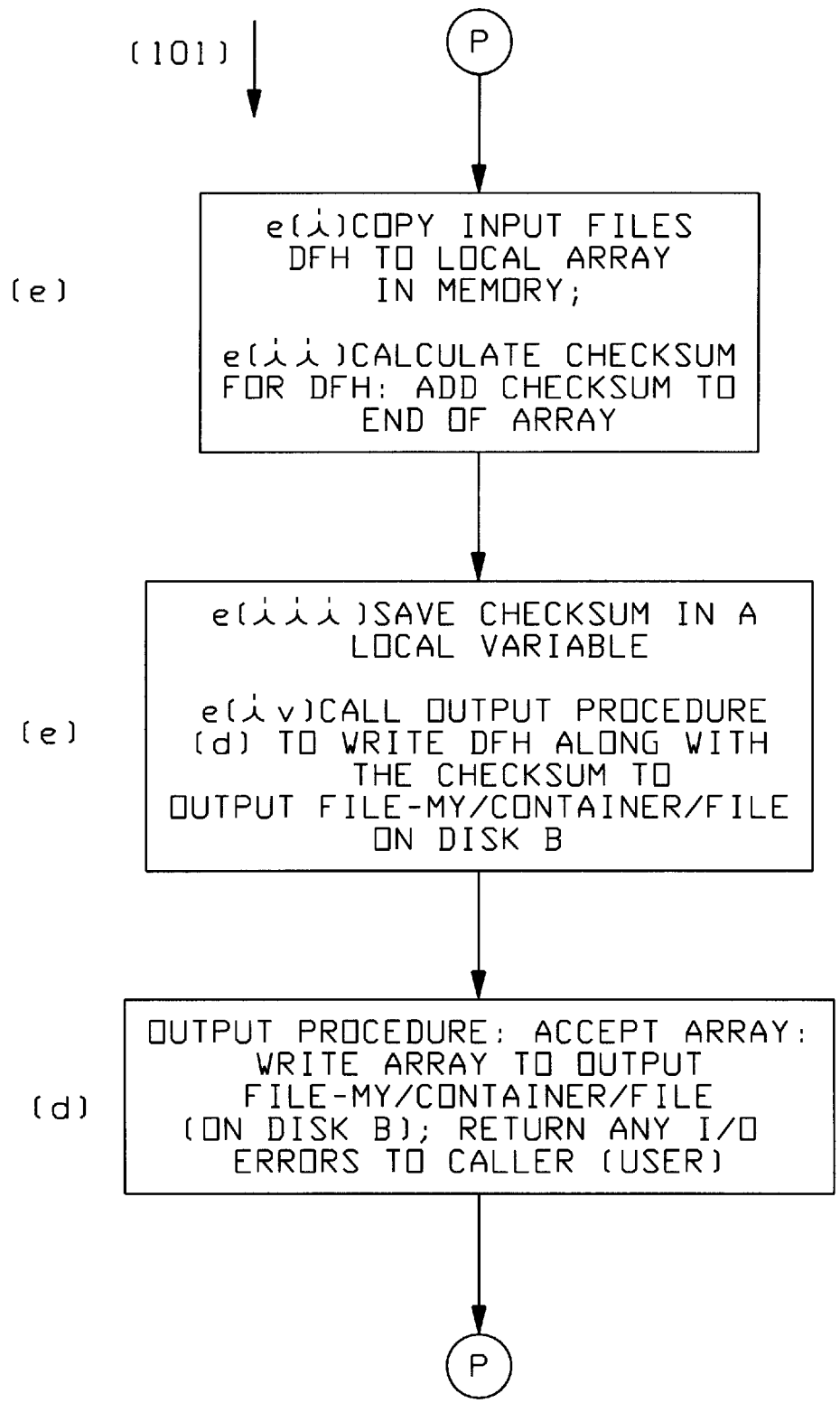

Continuing from step (c) of FIG. 2A-1 which has called in the MCP_WRAPPER operation step (e), it will be seen that the output procedure (d) is invoked by this step (e) at e (iv), FIG. 2A-2, enabling MCP_WRAPPER operation to pass the input file data over to be written to the new byte-stream data file at step (d), FIG. 2A-2.

Figures 2, 2A, 3:
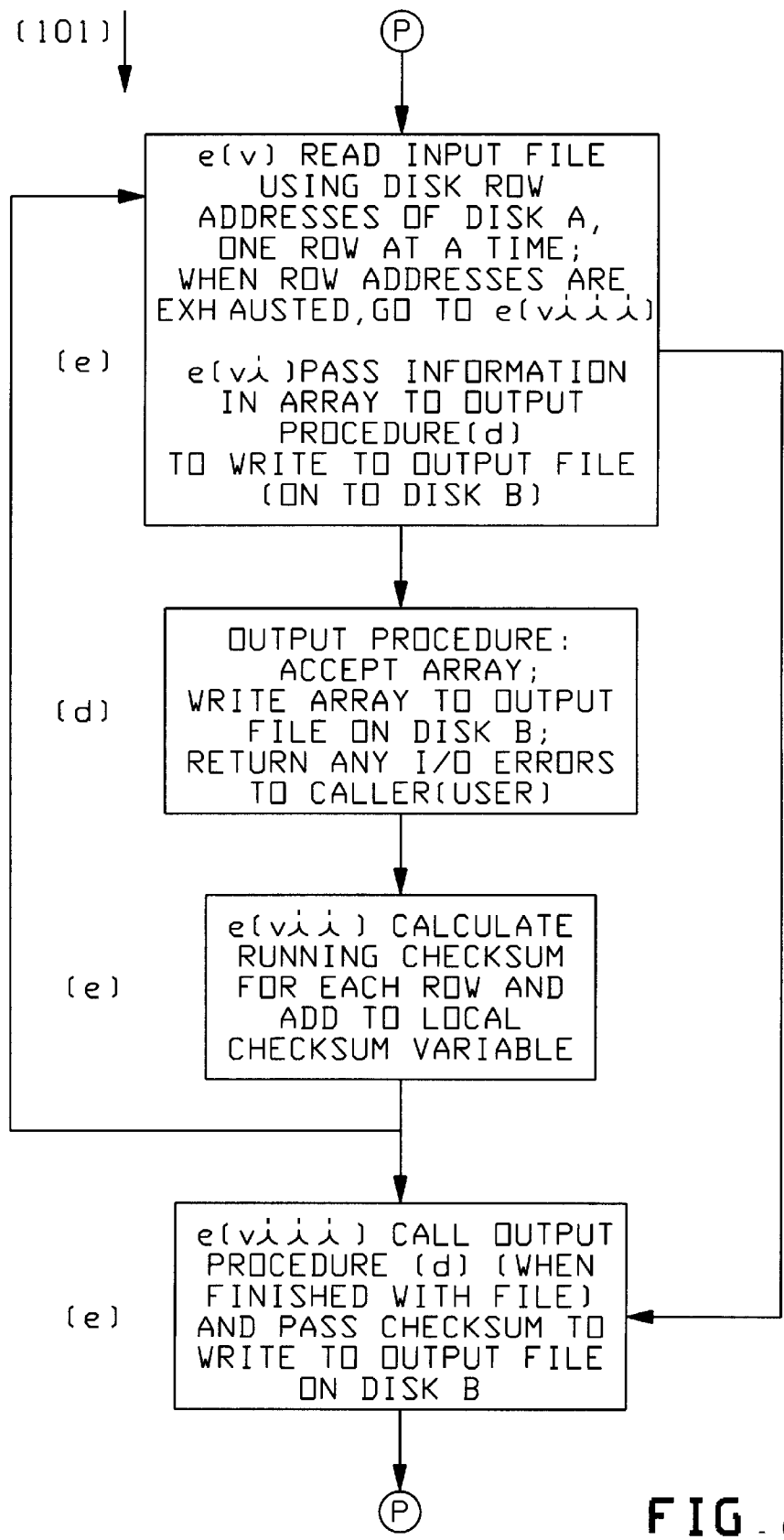
FIG. 3 is an illustration of the format for a container data file as a byte-stream file.
Figures 2, 2A, 3, 4:
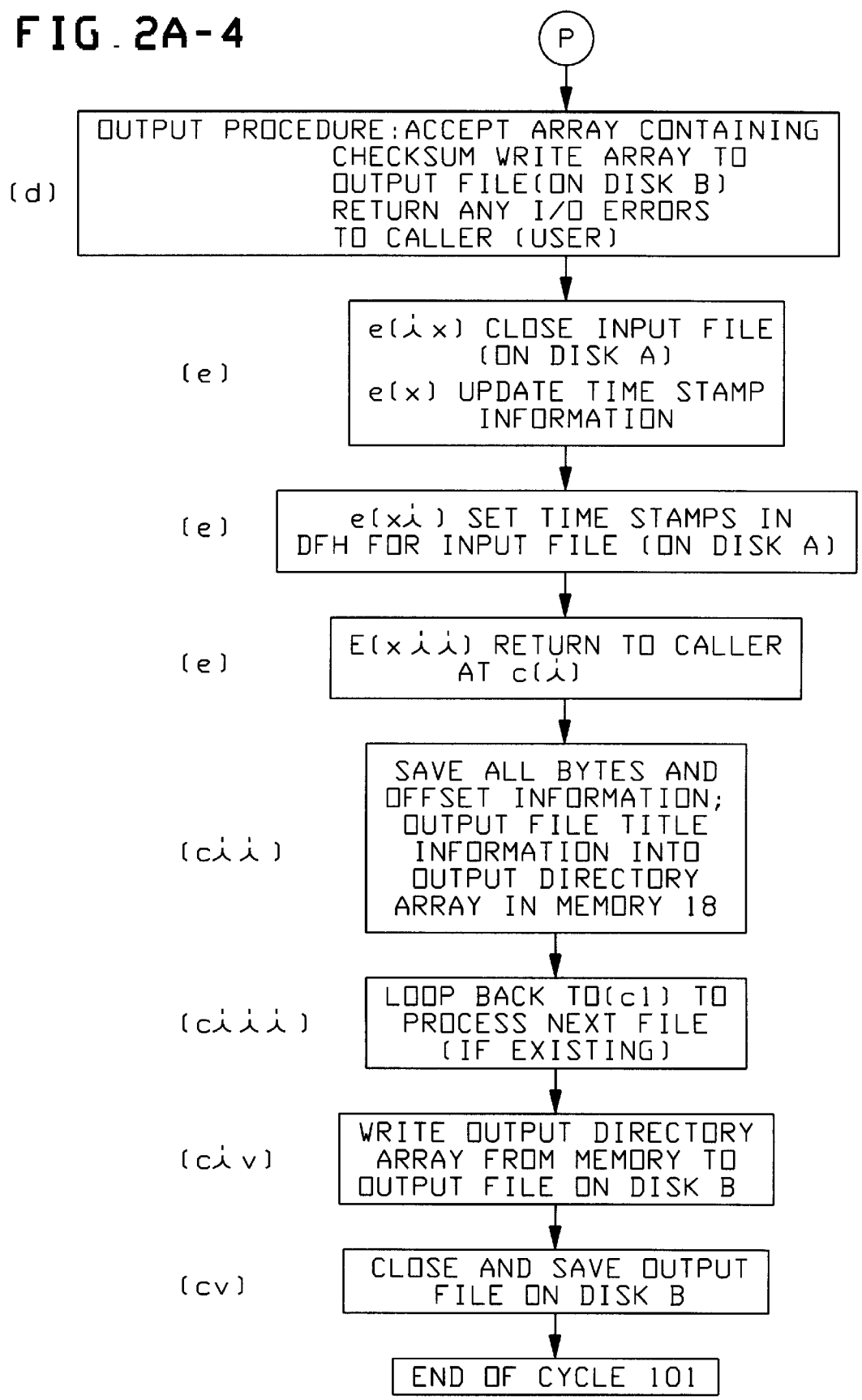
FIG. 4 is on illustration of the format for a single data file as a byte-stream file.

At step (e)(v), FIG. 2A-3, the MCP_WRAPPER software will cause a Read of the input file using disk row addresses of the Disk A, one at a time, until there are no more disk row addresses for the file. When the disk row addresses are exhausted, the software will proceed to step (e)(viii). At step (e)(vi), the program will pass information in the array onto the output procedure (d) in order to Write the array information to the output file. For descriptive purposes, the "input" file is the file being "Read", (MY/FILE) while the "output" file is the new file being created or written (MY/CONTAINER/FILE).

At step (e) (vii), the program calculates the running checksum for each row and adds this onto the checksum variable. Using the local checksum variable, a checksum is calculated for the entire file as it is being repackaged. This checksum will reside in the file and be later used by the unwrap operation to verify that the file was not unintentionally corrupted while transferring across a second system platform.

Then at step (e)(viii), the MCP_WRAPPER program will call the output procedure (d) FIG. 2A-4 and pass the checksum to write the checksum value over to the output data file, (Disk B).

At step (e) (ix), the program will close the input file, and at step (e) (x), will update the timestamp information for the original file (A Series DFH Attribute Information).

At step (e) (xi), the program will set timestamps in the disk file header (DFH) for the input file (Disk A) and then return [step e(xii)] to the MCP_FILEWRAPPER procedure at c(1) FIG. 2A-1 from where it was called.

At step c(ii) at FIG. 2A-1 and FIG. 2A-4, the MCP_FILEWRAPPER program will save all bytes and offset information and the Output File Title Information in the Output Directory Array in Memory 18.

At step c(iii) MCP_FILE WRAPPER will loop back to c(i) to process the next file if it exists.

At step c(iv) MCP_FILEWRAPPER will write the Output Directory Array from Memory 18 to the Output File on Disk B.

At step c(v) the MCP_FILEWRAPPER program will close and save the output file on Disk B.

Figure 2B:
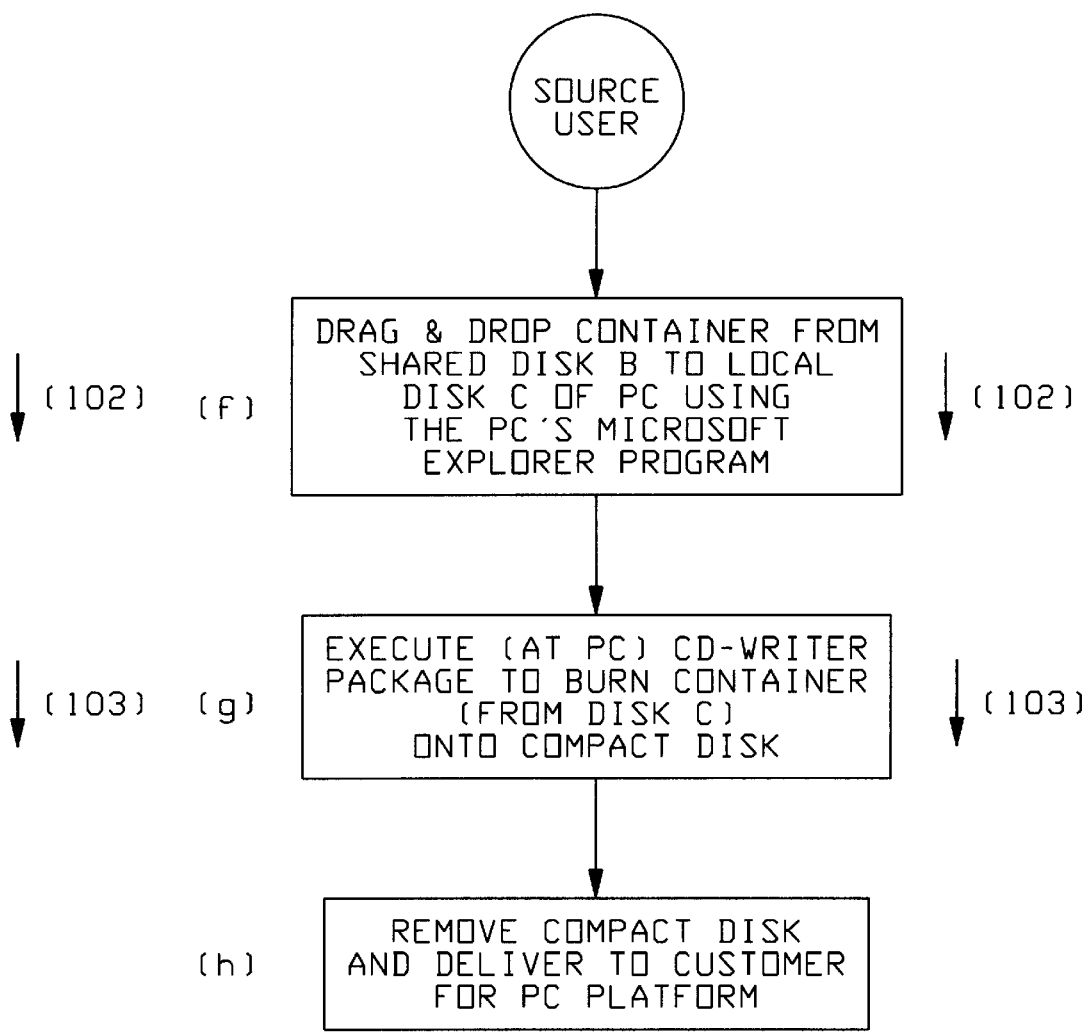

Now referring to FIG. 2B, the source user will initiate at (f) the operation (marker cycle 102 of FIG. 1A) to drag the files (MY/CONTAINER/FILE), using the Microsoft Explorer program, from the shared Disk B,22 over to the local Disk C,24 where it becomes C:\MY\CONTAINER\FILE. Then Source User 8, using marker channel cycle 103 will initiate the CD Writer package.

The shared disk would be a LAN connected Disk B owned by the first system, that the PC has access to.

At step (g), on marker cycle 103 (of FIG. 1A and FIG. 2B), the User 8 will execute (within the client terminal 30), a CD-WRITER package in order to burn the container onto a Compact Disk, 34.

At step (h), FIG. 2B, the Compact Disk 34, once it has been burned with the container, can be removed and delivered to a customer-client terminal for that party's PC (Personal Computer) platform.

Described herein has been a method and system whereby native specialized container files in a first computer system, can use the operating system of the first computer system together with first and second programmatic interfaces therein in order to transform a file (native to the first system) into a standard byte-stream container file which is compatible with many other types of computer platforms (second system), and which byte-stream files can be burned into a CD-ROM which is then available for transport by multiple numbers of other system platforms.

While other variations and embodiments of the described method may be implemented for various purposes, the invention is defined by the following claims appended herein.

What is claimed is:

1. A method, whereby multiple individual files with their attributes of a first platform and compatible in protocol for said first platform constitute a first platform Container which can be seen as a single test stream data file consisting of a directory and native data files, and wherein said Container can be utilized by a second platform for burning onto a Compact Disk, said method comprising the steps of:

(a) converting said first platform's native files into a Container which is a text stream data file compatible with industry-standard protocols;

(b) using a Work Flow Language Command WRAP MY/FILE into MY/CONTAINER/FILE to select said data files and create said directory from a first disk for conversion from a first platform special protocol format into a File Transfer Protocol format for placement on a second disk as a text stream data file which is accessible to said first platform and second platform:

(c) burning said text stream data file using said second platform onto a Compact Disk.

2. The method of claim 1 wherein step (b) includes the steps of:

(b1) utilizing a first program (MCP_FILEWRAPPER) to verify the name of each selected data file (KY/FILE/=) and to open a new file for output from a first storage medium to a second storage medium;

(b2) calling, by said MCP_FILEWRAPPER program, a second program (MCP_WRAPPER) to transform the said native data files of said first platform into a standard byte stream text data on said second storage medium as C:\MY\CONTAINER\FILE;

(b3) utilizing a first program (MCP_FILEWRAPPER) to create a directory of selected data files (KY/FILE/=) and to write said directory onto said second storage medium as part of C:\MY\CONTAINER\FILE.

3. The method of claim 1 wherein step (c) includes the steps of:

(c1) utilizing said second computer platform to transfer C:\MY\CONTAINER\FILE from said second storage medium to a third storage medium;

(c2) utilizing said second computer platform and its CD Write module to access said C:\MY\CONTAINER\FILE from said third storage medium and to burn said Container file onto said CD (Compact Disk).

4. A network by which a client user of a first computer platform, having an original native specialized format set of data files and a directory of said files is enabled to reformat said files into a Container which is in a standard byte stream text format suitable for Internet transmission or for compatible use by a second computer platform, said network comprising:
 (a) means for converting said first computer platform's native files and a directory of said files into a text stream data file compatible with industry-standard file transfer protocols and compatible with said second platform.
 (b) means for converting said Container including:
  (b1) means to call a first program (MCP_FILEWRAPPER) to verify the name of each data file in said Container and create a directory of said files residing on a first disk and to open a new file for output to a second disk after calling a second program (MCP_WRAPPER);
  (b2) means to call said second program (MCP_WRAPPER) to convert said original native format files into a standard byte stream text data file (MY/CONTAINER/FILE) for deposit onto said second disk;
  (b3) means in said second platform for transferring said Container of said byte stream text data file onto a third disk as C:\MY\CONTAINER\FILE and including:
   (b3a) means to access a CD Write module for burning said C:\MY\CONTAINER\FILE onto a Compact Disk.

5. A network by which a client user of a first computer platform having an original native specialized format for multiple data files and a directory of said files, is enabled to re-format said files into a Container of standard byte-stream format suitable for use by a second computer platform or for transfer over the Internet, said network comprising:
 (a) a first computer platform having main memory, a CPU, a Master Control Program operating system, a Work Flow Language computer and a first storage medium (Disk A) for holding said original native specialized format files, said first platform including:
  (a1) a first program (MCP_FILEWRAPPER) to verify the name of each data file, to create a directory of said data files in said directory and to open a new file to send to a second storage medium after calling a second program (NCP_WRAPPER), said first program for placing a directory of files onto said second storage medium as MY/CONTAINER/FILE;
  (a2) said second program (MCP_WRAPPER) for converting said original native specialized format files into a standard byte stream format text data file Container (MY/CONTAINER/FILE) and placed onto a second storage media which is shared by a said second computer platform;
 (b) said second computer platform having main memory, a CPU, a different operating system from said first platform and a third storage medium and including:
  (b1) a special program, initiated by said client user, for transferring said Container (MY/CONTAINER/FILE) on said second storage medium to said third storage medium as a resultant standard text data file Container (C:\MY\CONTAINER\FILE);
  (b2) a CD Writer means connected to said third storage medium for accessing said Container (C:\MY\CONTAINER\FILE);
 (c) client user terminal means for initiating said CD Writer means to burn said Container onto a Compact Disk;
 (d) said Compact Disk for receiving said resultant Container in said standard byte stream text format utilizable by different computer platforms.

* * * * *

UNITED STATES PATENT AND TRADEMARK OFFICE
CERTIFICATE OF CORRECTION

PATENT NO. : 6,088,747

DATED : July 11, 2000

INVENTOR(S) : Lauren Ann Cotugno, et al

It is certified that error appears in the above-identified patent and that said Letters Patent is hereby corrected as shown below:

On the Title Page, insert Item [73] Assignee ----- Unisys Corporation ----.

Signed and Sealed this

Twenty-ninth Day of May, 2001

*Attest:*

NICHOLAS P. GODICI

*Attesting Officer*     *Acting Director of the United States Patent and Trademark Office*